United States Patent
Evangelista et al.

(10) Patent No.: US 9,972,064 B1
(45) Date of Patent: May 15, 2018

(54) NON-INTRUSIVE AND LOW-POWER RECORDING

(71) Applicant: Amazon Technologies, Inc., Seattle, WA (US)

(72) Inventors: Bruno Pereira Evangelista, Sunnyvale, CA (US); Ozgur Cem Sen, Santa Clara, CA (US); Biju Balakrishna Pillai, Cupertino, CA (US); Christopher Karl Lang, Irvine, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 278 days.

(21) Appl. No.: 14/753,116

(22) Filed: Jun. 29, 2015

(51) Int. Cl.
| | |
|---|---|
| *G06T 1/60* | (2006.01) |
| *H04N 21/433* | (2011.01) |
| *H04N 21/478* | (2011.01) |
| *H04N 5/44* | (2011.01) |
| *G06F 3/14* | (2006.01) |
| *G06F 3/048* | (2013.01) |
| *A63F 13/23* | (2014.01) |

(52) U.S. Cl.
CPC ............... *G06T 1/60* (2013.01); *A63F 13/23* (2014.09); *G06F 3/048* (2013.01); *G06F 3/14* (2013.01); *H04N 5/4401* (2013.01); *H04N 21/4334* (2013.01); *H04N 21/4781* (2013.01)

(58) Field of Classification Search
CPC . G06T 1/60; A63F 13/23; G06F 3/048; G06F 3/14; H04N 5/4401; H04N 21/4334; H04N 21/4781

USPC .......................................................... 345/522
See application file for complete search history.

(56) References Cited

U.S. PATENT DOCUMENTS

| | | |
|---|---|---|
| 8,410,994 B1 | 4/2013 | Testa |
| 2012/0042102 A1 | 2/2012 | Chung |
| 2014/0022266 A1* | 1/2014 | Metz .......................... G06T 1/20 345/522 |
| 2014/0078402 A1 | 3/2014 | Weast |
| 2014/0098291 A1 | 4/2014 | Higashi |
| 2014/0152895 A1 | 6/2014 | Kazawa |
| 2014/0310599 A1 | 10/2014 | Clift |
| 2014/0362293 A1 | 12/2014 | Bakar |
| 2016/0027143 A1* | 1/2016 | Amidei ..................... G06T 1/20 345/522 |

\* cited by examiner

*Primary Examiner* — King Poon
*Assistant Examiner* — Vincent Peren
(74) *Attorney, Agent, or Firm* — Pierce Atwood LLP

(57) ABSTRACT

Devices, systems and methods are disclosed for capturing a display by storing graphical commands and generating video data using the graphical commands at a later point in time. For example, a device may store graphical commands while generating display data associated with the graphical commands. The device may modify the graphical commands to replace data included in the graphical commands with pointers to the data. Optionally, the device may transmit the graphical commands to a server. The device and/or server may identify the data referenced by the pointers, execute the graphical commands to generate display data and encode the display data to generate a video of the original display.

24 Claims, 14 Drawing Sheets

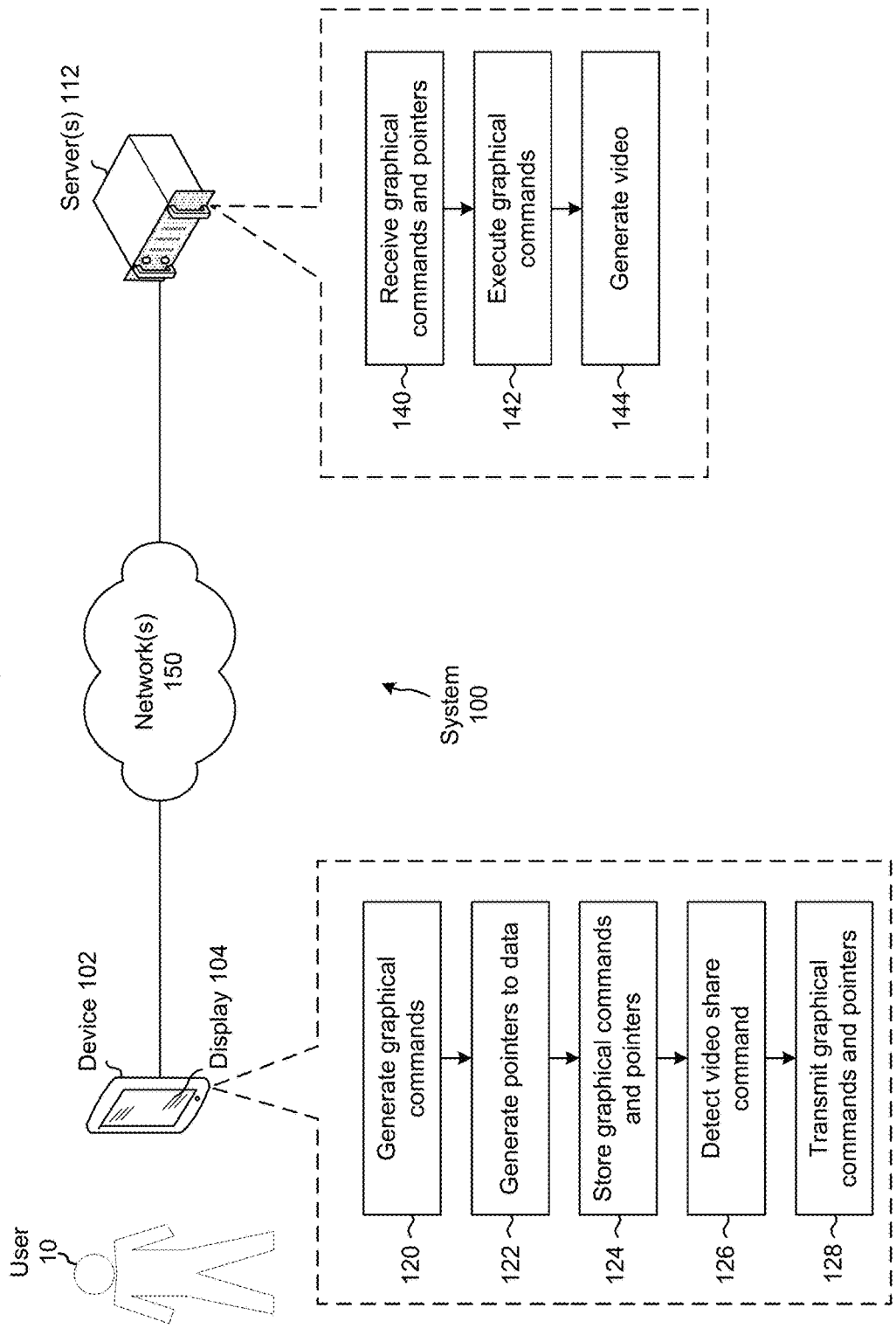

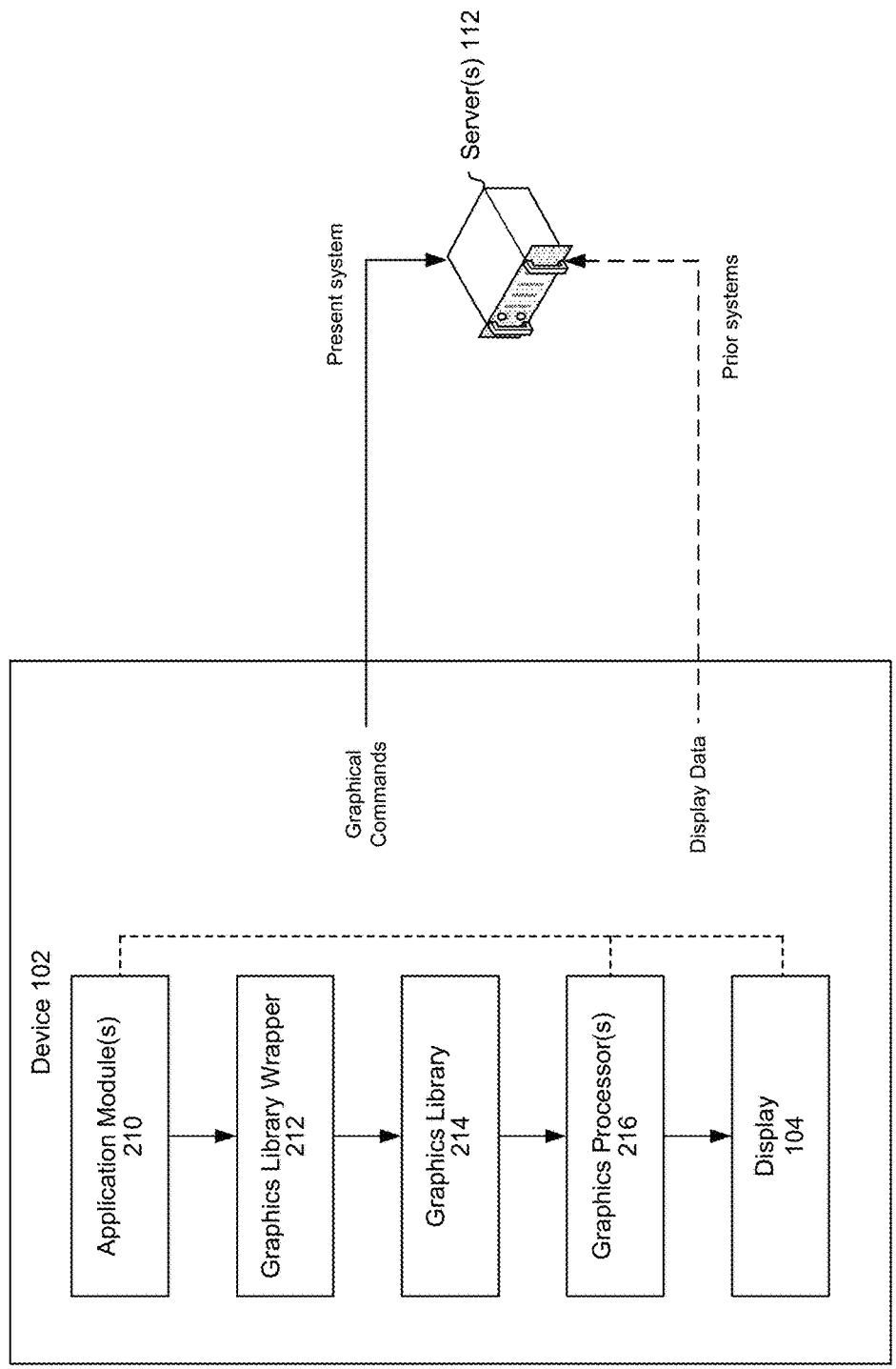

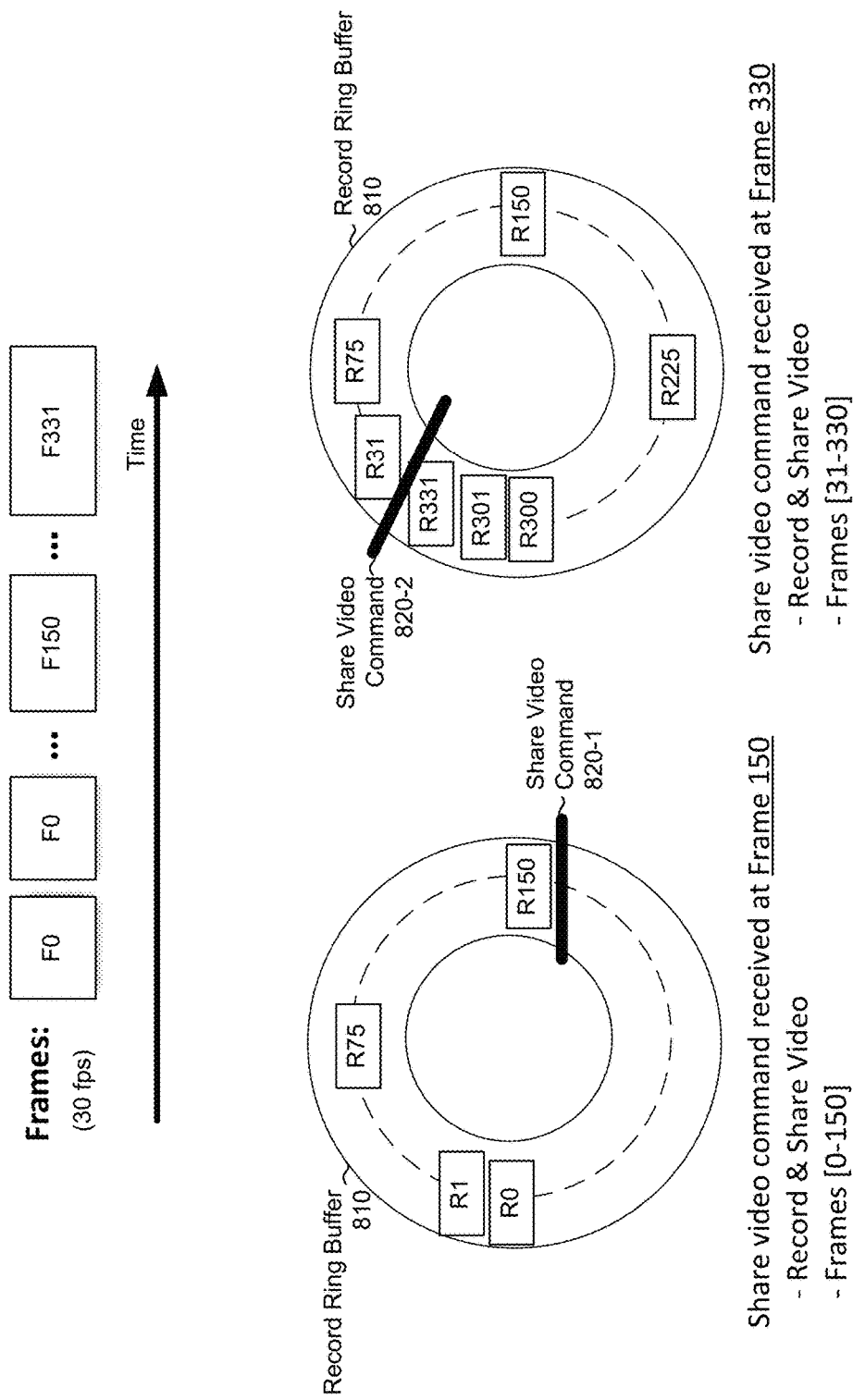

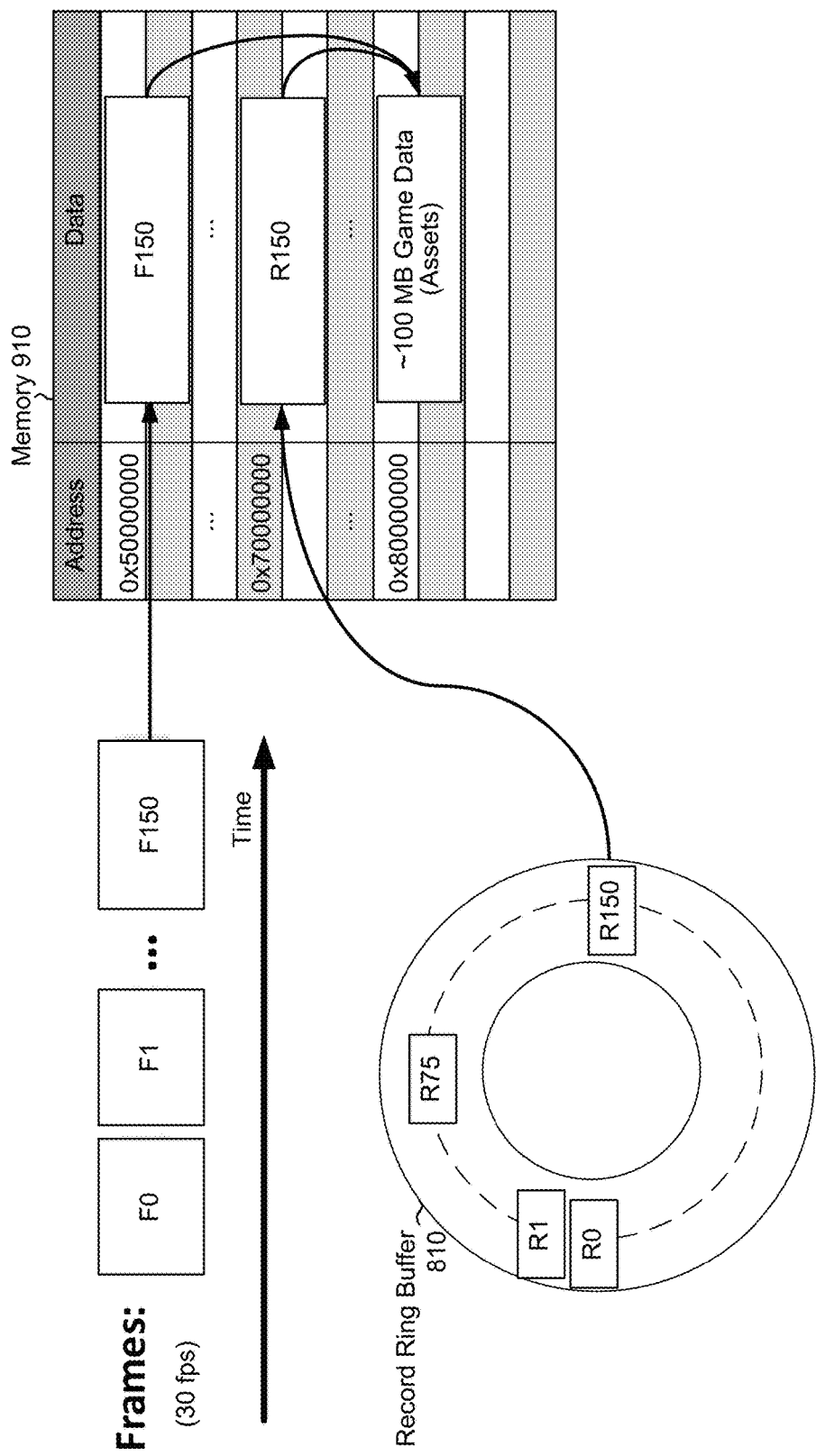

FIG. 10

| Graphical Commands | Compressed Graphical Commands |
|---|---|
| COMMAND BUFFER ADDR | |
| Clear Target1 with ColorRGBA(0, 0, 0, 1) | Clear Target1 with ColorRGBA(0, 0, 0, 1) |
| Upload: 1MB from 0x80000000 to VertexBuffer1 | Upload: Hash16B(0x80000000) to VertexBuffer1 |
| Upload: 1MB from HERE to VertexBuffer2 | Upload: Hash16B(HERE) to VertexBuffer2 |
| ... | ... |
| Bind: FetchShader7, VertexShader3, PixelShade32 | Bind: FetchShader7, VertexShader3, PixelShade32 |
| Bind: VertexBuffer1 to PipelineInput0 | Bind: VertexBuffer1 to PipelineInput0 |
| Bind: VertexBuffer2 to PipelineInput1 | Bind: VertexBuffer2 to PipelineInput1 |
| Bind: VertexBuffer1 to PipelineInput0 (unnecessary) | Bind: VertexBuffer1 to PipelineInput0 (unnecessary) |
| DrawTriangles: 100 (draw 100 triangles) | DrawTriangles: 100 (draw 100 triangles) |
| LAST CB BYTE (BEGIN ADDR + PTR SIZE - 1) | |
| ... | |
| VERTEX BUFFER DATA | |

R150

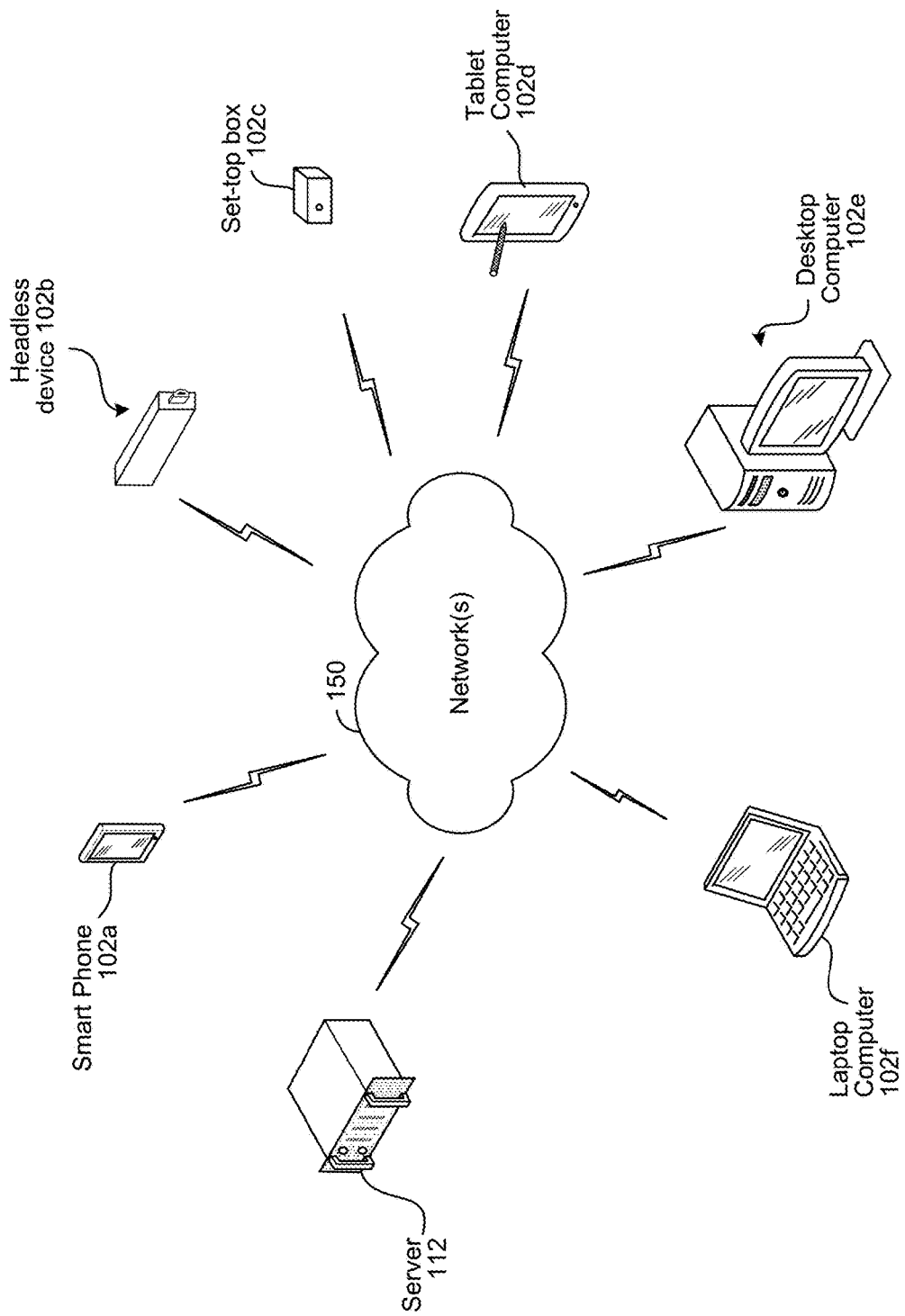

NON-INTRUSIVE AND LOW-POWER RECORDING

BACKGROUND

A wide variety of media devices are available for consumers to use for the consumption of an ever growing selection of content. These media devices may include televisions, tablet computers, personal computers, electronic book readers, gaming consoles, set-top boxes, media players, in-vehicle entertainment systems, portable media players, smartphones, and so forth. The content presented by these media devices may include audio, video, electronic books, games, and so forth. The content may be downloaded or streamed from a content provider to the media device.

BRIEF DESCRIPTION OF DRAWINGS

For a more complete understanding of the present disclosure, reference is now made to the following description taken in conjunction with the accompanying drawings.

FIG. 1 illustrates an overview of a system for recording graphical commands according to embodiments of the present disclosure.

FIGS. 2A-2B illustrate generation of graphical commands for execution, display, and display sharing according to embodiments of the present disclosure.

FIG. 8 illustrates an example of a record ring buffer according to embodiments of the present disclosure.

FIG. 9 illustrates an example of storing a display frame and a recorded frame according to embodiments of the present disclosure.

FIG. 10 illustrates examples of graphical commands and compressed graphical commands according to embodiments of the present disclosure.

FIG. 12 illustrates an example of a computer network for use with the system.

DETAILED DESCRIPTION

Figure 2B:
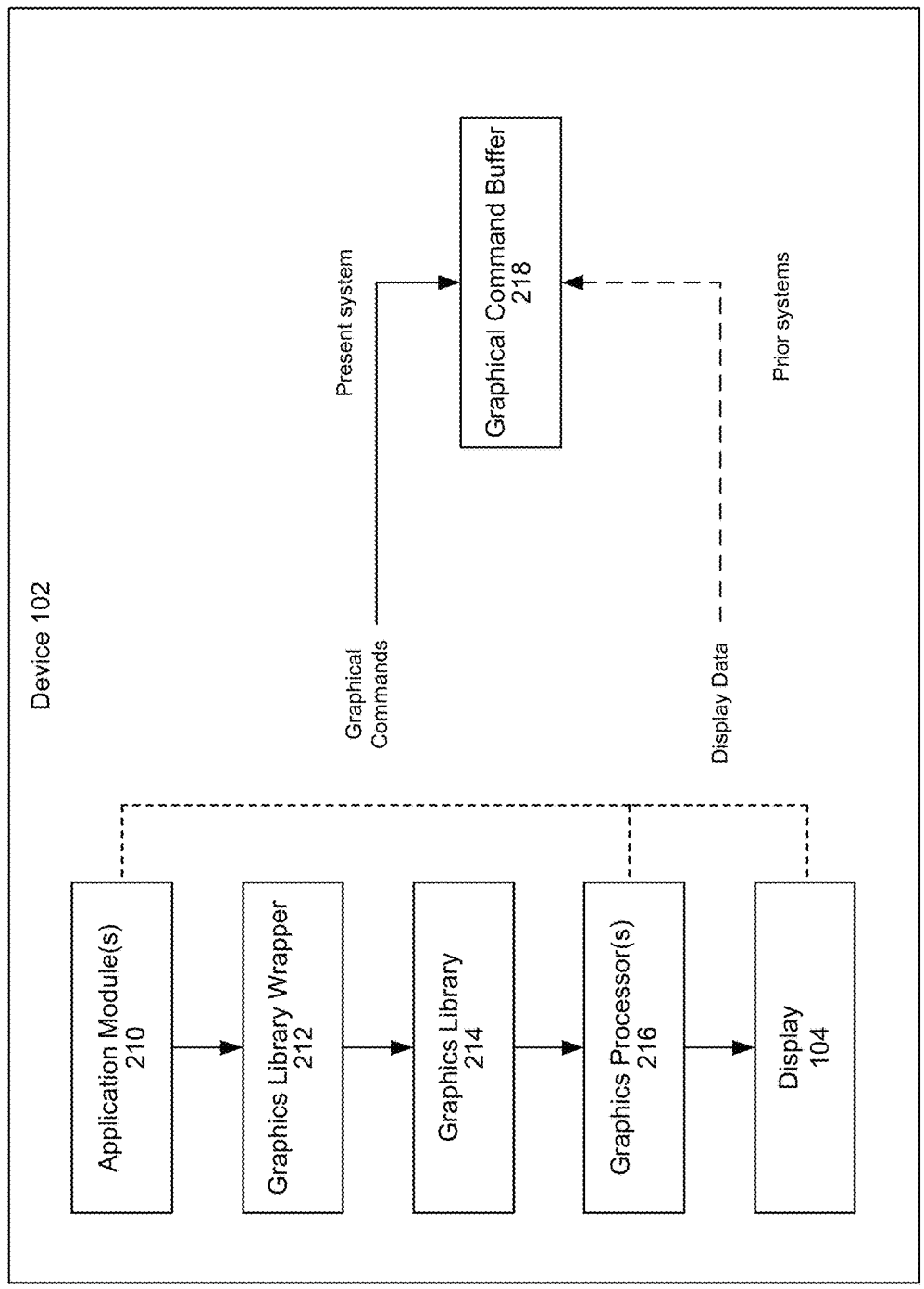

Media devices may display audio/visual content for display to a user. These media devices may include televisions, tablet computers, personal computers, electronic book readers, gaming consoles, set-top boxes, media players, in-vehicle entertainment systems, portable media players, tablet computers, smartphones, and so forth. The content may include audio, video, electronic books, games, and so forth. Sometimes a user may wish to record audio/visual content that is generated for playback at a later time. One technique of recording the visual content is by copying the output of the display, which may be referred to as screen capturing.

However, screen capturing may be processor, memory and/or power intensive and suffers from a number of drawbacks. First, when saving a recording on a local device, screen capturing may involve capturing the screen display and encoding rasterized video display data (to reduce a size of the recording). Second, when sending the recording to a remote device, screen capturing may involve capturing the screen display, encoding rasterized video display data, packetizing the encoded data, and sending the packetized data over a network connection. Third, screen capturing may result in low quality images due to both the data encoding (which reduces fidelity) and based on a screen size and quality of the display as data rasterized at a fixed resolution (e.g., 720p) cannot be scaled up or down without a loss of quality. For example, display data formatted for a small screen may not look good when displayed on a larger (and potentially higher resolution) screen. Other drawbacks also exist. Therefore, improved display recording methods are desired to record audio/visual content of a device requiring lower processor, memory and power consumption.

Offered is an improved graphical command recording system and method. Instead of saving or transmitting the processed display data of a device for later playback (which simply copies the image of the display), the device may save or transmit higher level display or graphical instructions/ commands (hereinafter, "graphical commands"). As the graphical commands may reference data (without necessarily including the data within the graphical command), the device may record a series of graphical commands while requiring less processor, memory and/or power consumption compared to screen capturing as the graphical commands are significantly smaller in terms of data size than encoded video data. Upon receiving a share video command from a user indicating that the device generate using recent graphical commands, the device (or a remote device) may recreate the environment of the graphical commands (including the data referenced in the graphical commands), execute the graphical commands and generate video data, thus rendering the visual content at a later time. For example, while an application is running on the device, the device may store graphical commands including references to application data associated with the application. Upon receiving the share video command, the device may load the application including the application data, access the stored graphical commands, execute the stored graphical commands and generate video data of the playback. Audio data corresponding to the video data may also be captured and stored so that it can accompany the video data during playback. Thus, a system configured to store graphical commands in a circular buffer type storage may be configured to create an "always on" application recording, that, upon initiation (for example through a user pushing a button) may retrieve stored commands that can be executed to recreate the video output (for example portions of a video game) associated with the stored graphical commands.

FIG. 1 illustrates an overview of a system 100 for implementing embodiments of the disclosure. A user 10 operates a device 102, for example running an application such as a video game application. The device 102 prepares graphical commands (also called graphical instructions) in order to generate image(s) for the user 10 on a display 104. The graphical commands may be commands such as calls between an application and a graphics library. The graphical commands may also be instructions sent from a graphics library for execution by a processor, such as a graphics processor. Graphical commands are discussed in further detail below. While FIG. 1 illustrates the display 104 being part of the device 102, the display 104 may be external to the device 102 or included in a separate device without departing from the present disclosure. For example, the device 102 may be a headless device (e.g., a set-top box, Universal Serial Bus (USB) device or the like) configured to generate display data for an external display 104.

The device 102 may record the graphical commands associated with the operation of the device (e.g., graphical commands associated with the video game) by either storing the graphical commands on the device 102 or sending the graphical commands to server(s) 112 via network(s) 150. The device 102 and/or the server(s) 112 may generate video data based on the recorded graphical commands. Therefore, the device 102 may record operation of the device 102 with relatively low processing, memory and/or power consumption.

The network(s) 150 illustrated in FIG. 1 may include local area networks ("LANs") and wide area networks ("WANs"). The LANs may be supported using an access point topology, ad-hoc peer to peer topology, and so forth. The LANs may be wired, wireless, or a combination. The LANs may be implemented using Ethernet, Wi-Fi, Bluetooth, ZigBee, and so forth. The LAN(s) may connect to one or more WANs. The WAN may include one or more public networks such as the Internet, private networks, cellular data networks, or a combination thereof. The server(s) 112 may exchange information with each other and/or the device 102. While the server(s) 112 are depicted as single servers, in some implementations the server(s) 112 or the functions attributed to the server(s) 112 may be provided by a plurality of devices. For example, the server(s) 112 may be implemented as a virtualized server executing across a plurality of physical servers.

As illustrated in FIG. 1, the device 102 may generate (120) graphical commands associated with the operation of the device 102. For example, if the user 10 is playing a video game, the device 102 may generate graphical commands operating on data associated with the video game, may execute the graphical commands to generate display data and may display the display data on the display 104 to the user 10. Thus, images displayed on the display 104 may include display data generated from graphical commands.

The data associated with the video game may include application data associated with the video game, such as textures, shaders and other application-specific data, general data associated with multiple applications or user-specific data associated with the user 10. The data may be stored on the device 102 or on the server(s) 112. For example, if the user 10 is playing a video game locally on the device 102, the data may be stored on the device 102 and the device 102 may operate the video game without an internet connection. In contrast, if the user 10 is playing a web-based video game on the device 102, the data may be stored on the device 102 and/or the server(s) 112 and the device 102 may only operate the video game with an internet connection.

The device 102 may generate (122) pointers to the data included in the graphical commands. For example, the device 102 may generate pointers referencing memory addresses containing the data on the device 102 and/or the server(s) 112. In some examples, if the graphical command operates on data local to the device 102 using a relative address (e.g., buffer address or other address in memory that stores data for a short period of time), the device 102 may determine a pointer including a fixed address (e.g., absolute address to a unique location in the device 102). Thus, the pointer may refer to a valid memory address containing the data even when the application is not running.

The device 102 may store (124) the graphical commands and the pointers. For example, the device 102 may store the graphical commands and the pointers in a fixed size window memory (e.g., buffer) that only stores a programmed number of graphical commands. Thus, the device 102 may overwrite an oldest graphical command with a newest graphical command, for example in a circular buffer, rollover buffer or other fixed size memory buffer (e.g., record ring buffer illustrated in FIGS. 8-9). The device 102 may store the pointers within the graphical commands, for example by replacing any references to data within the pointers. However, the present disclosure is not limited thereto and graphical commands including references to absolute addresses may be stored in the fixed size window memory without associated data pointers. In addition, in some examples the device 102 may store indicators that indicate an order of the graphical commands. For example, a first graphical command may precede a second graphical command, and the device 102 may store an indicator indicating that the first graphical command is to be executed prior to the second graphical command.

The device 102 may display the display data as frames on the display 104, with each frame corresponding to an image shown at a specific time. For example, the device 102 may display the display data at a fixed frame rate, such as 30 frames per second (fps). The device 102 may execute the graphical commands associated with an individual frame to generate the display data for the individual frame. Therefore, the device 102 may store the graphical commands associated with each individual frame as groups of graphical commands. For example, the device 102 may store graphical commands associated with a first frame in a buffer followed by graphical commands associated with a second frame, with the buffer configured to store a fixed number of frames. After storing the graphical commands in the buffer, the device 102 may delete the display data associated with the frame. To generate a video at a later point in time, the device 102 and/or server(s) 112 may execute the graphical commands stored in the buffer to recreate the display data. Thus, a buffer configured to store 1800 frames may generate a video approximately one minute in length at 30 fps, although the present disclosure is not limited thereto.

In some examples, the device 102 may store graphical commands from a plurality of applications in a single buffer. As a result, a video generated using the graphical commands will include all display data displayed by the device during a period of time prior to the device 102 receiving the share video command. However, the present disclosure is not limited thereto. Instead, the device 102 may store the graphical commands and the pointers in one or more buffers based on an application associated with the graphical commands. Thus, the device 102 may have one or multiple applications (e.g., processes) running on the device 102 simultaneously and can record graphical commands associated with each of the running applications. The device 102 may store graphical commands for all applications (e.g., in a single buffer as discussed above), one buffer-per-process, white-listed processes or for a single application. For example, the device 102 may store graphical commands associated with a first application (e.g., video game) in a first buffer and may store graphical commands associated with a second application in a second buffer. When the device 102 switches from the first application to the second application, the device 102 may store the graphical commands in the respective buffers such that the first buffer includes a series of graphical commands associated with the first application and the second buffer includes a series of graphical commands associated with the second application. As a result, the device 102 may generate a video of recent gameplay of the first application without interruptions caused by the user 10 switching between the first application and the second application.

The device 102 may detect (126) a share video command and may transmit (128) the graphical commands and the pointers. For example, the user 10 may click on a share video button in an application or otherwise indicate using a user interface an intention to share a video generated from the most recent graphical commands stored in the buffer. Thus, the device 102 may receive a user indication to generate a video based on previously input graphical commands. Upon receiving the share video command, the device 102 may determine the corresponding graphical commands and generate a video using the stored graphical commands. For example, the device 102 may determine a current application, identify a buffer of graphical commands associated with the current application and determine a time frame associated with the share video command. In some examples, the device 102 may generate video data using each of the graphical commands stored in the buffer, such as a video having a fixed length of time. In other examples, the device 102 may generate video data using a portion of the graphical commands stored in the buffer, such as beginning at a point of interest or the like. The device 102 may retrieve the graphical commands from the buffer and may transmit the graphical commands to the server(s) 112 to generate the video data. While FIG. 1 illustrates the server(s) 112 generating the video data, the present disclosure is not limited thereto and the device 102 may execute the graphical commands to generate the video data on the device 102.

In some examples, the device 102 may transmit the graphical commands and the pointers as a group. For example, the device 102 may generate a series of graphical commands, store the series of graphical commands on the device 102, execute the series of graphical commands to generate display data and display the display data to the user 10. Subsequent to generating and displaying the display data associated with the series of graphical commands, the device 102 may transmit the stored graphical commands to the server(s) 112. Alternatively, the device 102 may transmit the graphical commands and the pointers to the server(s) 112 as they occur, such that the graphical commands and the pointers are stored in a memory buffer located in the server(s) 112. For example, when the device 102 is running a web-based video game, the device 102 may generate a graphical command, execute the graphical command to generate display data, display the display data to the user 10 and transmit the graphical command and associated pointers to the server(s) 112 prior to generating an additional graphical command. In another example, graphical commands and/or pointers may be stored on the local device 102 and only transmitted to server(s) 112 upon receipt of an instruction, for example a command from user 10 to share the contents of the display 104. After receipt of the instruction, the device would then transmit the graphical commands and pointers in step 128. Therefore, while steps 120, 122, 124, 126 and 128 are illustrated in FIG. 1 as discrete steps for ease of explanation, the disclosure is not limited thereto. Instead, the device 102 may transmit the graphical commands and pointers in step 126 while the device 102 is performing step 120 to generate additional graphical commands. Thus, steps 120, 122, 124 and 126 may be performed concurrently or substantially simultaneously to the other steps illustrated in FIG. 1.

Concurrent with or subsequent to the device 102 transmitting the graphical commands and pointers, the server(s) 112 may receive (140) graphical commands and pointers. As discussed above, in some examples the server(s) 112 may receive the graphical commands and pointers in intervals, such as when the device 102 is playing a web-based game running on the server(s) 112. In other examples, the server(s) 112 may receive the graphical commands and pointers as a group, such as when the device 102 stores a series of graphical commands and sends the series of graphical commands and associated pointers after executing and displaying display data associated with the series of graphical commands.

The server(s) 112 may execute (142) the graphical commands. For example, the server(s) 112 may generate an environment including application-specific data and may execute the graphical commands. To generate the environment, the server(s) 112 may receive application data (e.g., application data referenced by graphical commands) and an initial state environment. The initial state environment may be used by the server(s) 112 to create a graphics context and configured the environment to render and generate an output using the graphical commands. For example, the initial state environment may include information associated with a resolution, bits-per-pixel, orientation, depth/stencil buffer information, initial GPU state or the like. The environment may also be based on device settings associated with the local device 102, for example the settings of the local device 102 when the local device generated the graphical command. The server(s) 112 may then generate the environment by configuring computing resources (memory, settings, etc.) using the local device settings so that the computing resources will execute the graphical commands in the same way the local device would have, thus ensuring that the ultimate result of executing the graphical commands is the same (for example, recreating a video game display at a time after the original game was played). Alternatively, the device 102 may also generate the environment using its own resources at a later time from when the graphical command was originally generated, thus allowing the device 102 to recreate how the application graphics (e.g., video game graphics) were originally displayed.

The server(s) 112 may use the pointers to identify data operated on by the graphical commands, which may include the application-specific data or other data stored on the server(s) 112. In some examples, the server(s) 112 may request information or data from the device 102 if a pointer references unknown data or data not accessible on the server(s) 112. Thus, the server(s) 112 may execute the graphical commands to recreate the original display data associated with the graphical commands. The recreation may take place at a later time from the original generation (120) of the graphical commands. The server(s) 112 may then generate (144) a video, such as by encoding the display data as video data. As illustrated in FIG. 1, the device 102 may transmit graphical commands used by the device 102 to generate display data and the server(s) 112 may generate a video including display data generated using the graphical commands.

The video generated by the server(s) 112 may recreate display data viewed by the user 10 when the graphical commands were originally executed by the device. Thus, the device 102 may store the graphical commands associated with the user 10 using the device 102 and the server(s) 112 may generate the video at a later point in time. In some examples, the user 10 may explicitly instruct the device 102 to generate the video by inputting a share video command, and the video may include a fixed period of time prior to the share video command. In other examples, the user 10 may explicitly instruct the device 102 to generate the video by inputting the share video command and the video may include a variable period of time prior to the share video command based on user input, a change in applications running on the device 102, a change within the application (e.g., a beginning of a new level in a video game) or the like. In some examples, the device 102 may automatically generate the video based on user preferences, such as every time a video game character dies or every time the user 10 scores above a threshold (e.g., sets a high score in a video game).

The video data may be generated using universal formats such as H.264/MPEG-4 or the like. Thus, while the graphical commands may be executed only by certain applications with associated application data, the video data may be transmitted and viewed on external devices without specific applications and/or associated application data. As a result, the user 10 may share the video data with other users, such as by transmitting the video data directly, transmitting a link to the video data, a second user accessing the video data through the server(s) 112 or the like. In some examples, the user 10 may send an email including the video data (or a link to the video data) to other users to share a video clip of what the user 10 accomplished. In other examples, the second user (or a plurality of users) may search the server(s) 112 for video clips and may access the video data stored in the server(s) 112.

To facilitate generating the video, the server(s) 112 may gather and cache resources associated with an application running on the device 102. For example, a plurality of users may be running the application on a plurality of devices 102 and the server(s) 112 may gather and cache unique resources on the server(s) 112. As a result, application data may be shared between the plurality of devices 102 and videos may be generated using the shared application data. If the server(s) 112 determine that application data is not currently stored on the server(s) 112, the server(s) 112 may transmit a request to a specific device 102 requesting the missing application data. The missing application data may then be stored on the server(s) 112 to generate subsequent videos for other devices 102. As a result of the caching process, the server(s) 112 may reduce an amount of application data uploaded from individual devices 102.

FIG. 2A illustrates an example configuration for generating graphical commands and display data in a device 102. An application module 210, such as a software application operating on a device, generates graphical commands for processing by lower levels to create images for a display 104. The application module 210 may generate a graphical command such as a call to a graphics library 214. The graphics library 214 may be configured for the particular hardware of the media device, such as a graphics library 214 including graphical data configured for the graphics processor 216 of the media device. The graphics library 214 may receive the call from the application module 210 and convert that call to an instruction that may be executed by a driver, graphics processor (such as graphics processor 216), or other component to generate display data (such as to be displayed on display 104). As part of generating the instruction to the lower level driver or graphics processor, the graphics library 214 may use graphical data such as the graphical assets discussed above. Although FIG. 2A illustrates the graphics library 214 as communicating directly with the graphics processor 216, a driver (not pictured) for the graphics processor 216 may be located in between the graphics library 214 and the graphics processor 216. In that situation, the graphics library 214 may generate graphical commands for operation by the driver. A display driver (also not pictured) may also be located between the graphics processor 216 and the display 104.

The device 102 may store one or more graphics libraries 214. The graphics library 214 may be configured as an implementation of an application programming interface (API) to coordinate interactions between applications and a graphics processor when generating graphics. An application programming interface may include a set of functions or routines, executed in software and/or hardware, to specify how computing components should interact with each other. An API may be in the form of a library that includes specifications for routines, data structures, object classes, variables, etc. A graphics library 214 may include graphical information for use in generating graphics. The one or more graphics libraries 214 may be configured for particular applications, operating systems, hardware, etc. As used here, the term graphics library may include the API and an instantiation of the API. In one example, one or more of the graphics libraries 214 may be an API implementation that interfaces between an application and lower levels according to the Open Graphics Library (OpenGL), Open GL|ES, EGL, or other standards.

The graphics library 214 may include an application interface, such as an API or instantiation of an API, to interface between the application and the lower level driver/processor. The graphics library 214 may operate according to the OpenGL standard. OpenGL describes a language independent API for generating commands for execution by a graphics processor. As shown in FIG. 2A, a graphics library wrapper 212 or binder may process calls from the application module(s) 210 prior to sending them to the graphics library 214. The graphics library wrapper 212 may provide a different interface to convert calls from the language of the application module 210 to the language of the graphics library 214. For example, Java OpenGL is a wrapper that allows OpenGL to be used in the Java programming language. The graphics library wrapper 212 may itself be an API. Calls to the graphics library wrapper 212 or graphics library 214 may be called graphics calls.

As illustrated in FIG. 2A, during operation, an application, such as an application operated by application module 210, may make a graphics call that is sent to the graphics library wrapper 212. That graphics library wrapper 212 may then process the call, for example by translating the call, and send the resulting translation, which is itself a call to the graphics library 214. The graphics library 214 may then process the call to create an instruction, such as a command in driver code, or the like to a driver, graphics processor 216 or other processor to create rendered images to be sent to the display 104 of the media device.

In one example, an application, such as a video game, is operated by the appropriate application module 210. During operation of the game, the application module 210 makes a call to the graphics library wrapper 212. The graphics library wrapper 212 then determines the appropriate graphics library 214 call for executing the desired graphics operation. The graphics library 214 then passes an instruction to the graphics processor 216. The graphics processor 216 then creates display data that may be sent to a display driver or display 104 to actually create and show images on the display 104 of the device.

As illustrated in FIG. 2A, for remote graphical command recording the calls to the graphics library 214 or graphics library wrapper 212, or the graphical instructions from the graphics library 214 to the graphics processor 216, or other graphical commands, of the device 102 may be duplicated and routed to server(s) 112 for native graphics generation on the server(s) to generate video data as described above.

Alternatively, as illustrated in FIG. 2B, for local graphical command recording the calls to the graphics library 214 or graphics library wrapper 212, or the graphical instructions from the graphics library 214 to the graphics processor 216, or other graphical commands, of the device 102 may be duplicated and stored in a graphical command buffer 218 on the device 102. The device 102 may retrieve the graphical commands from the graphical command buffer 218 and either generate video data as described above on the device 102 or transmit the graphical commands to the server(s) 112 to generate video data.

In one aspect, the present system differs from prior display capturing techniques in that the present system is configured to store graphical commands and/or send graphical commands from the device 102 to the server(s) 112 to generate video data. In contrast, prior display capturing techniques are configured to store display data and/or send display data between devices. The difference between graphical commands and display data is that graphical commands are higher level instructions for executed by higher layer computing resources such as an API or processor and display data is instructions and data used by lower layer computing resources, such as instructions configured for a monitor or display. Graphical commands may include commands like clear screen, set vertex buffer, draw elements, set texture, and the like. Graphical commands may operate on graphical data such as vector data used to draw lines and shapes (including indices, vertices, lines, points, curves, shapes, polygons, color, tangent, etc.), non-vector data (such as textures, etc.), graphical data address information, or other data used by a processor to render graphics.

Graphical commands may operate on pre-rasterized data or post-rasterized auxiliary data. Rasterization describes a process for mapping shapes to pixels for display on a display device. Rasterization typically occurs at the lower levels of a graphics pipeline, such as that shown in FIGS. 2A-2B. Pre-rasterized data may be data that is described in a vector graphics (i.e., shape) format rather than in a raster image (i.e., pixels or dots) format. Such pre-rasterized data may include the graphical data and graphical assets mentioned above, including vector data, non-vector data, and the like. For example, a graphical command may rasterize chair vector data (e.g., pre-rasterized data) to generate a chair pixel image using a texture image (e.g., post-rasterized auxiliary data) to give color and add wrinkle details to the chair.

Graphical commands may also operate on pre-rendered data. Rendering describes a process for generating an image from a model. Pre-rendered data may be data from which a pixel image may be generated. Such pre-rendered data may include, for example, model or scene files including geometry data, viewpoint data, texture data, lighting data, shading data, and the like. Display data may include post-rendered or post-rasterized image data such as bitmap data, video data, or pixel data for use by a display. Pixel data may include data to generate images for particular points on a display or image. Pixel data may include, for one or more pixels, color, brightness, and/or location. Graphical commands generally do not include display data. Graphical commands generally involve further execution or further processing in order to generate displayable data.

Display data may typically be configured or formatted for the particular display the images are to be sent to. For example, display data may be created in a format designed for a 720i resolution display, where pixel information is generated for a high-definition screen with 1280×720 pixels and where display data is output in a manner designed for an interlaced display. In another example, if display data is configured for a screen with a refresh rate of 60 Hz, the display data may include information to refresh the screen 60 times per second. In a traditional display capturing system, this display data (i.e., formatted for a 720i, 60 Hz screen) would be created based on the display 104 of the device 102. Such display data may include, for example, encoded video data such as H.264/MPEG-4 encoded video, as may be used by traditional display capturing system. If, however, the device 102 had a screen that was configured uniquely (for example, the device 102 had a 1020p, 120 Hz screen, or a 4K screen), the result would be the device 102 capturing display data configured for the display 104 that was inferior to display data had it been formatted for a different display. In the present system, by sending graphical commands from the device 102 to the server(s) 112, the server(s) 112 may execute the graphical commands to create display data configured and formatted for a variety of screens based on user preference.

The differences between graphical commands and display data may be further explained in reference again to FIG. 2A. As illustrated in FIG. 2A, graphical commands may include the graphics calls from an application module 210 to an API such as the graphics library wrapper 212 or the graphics library 214. Graphical commands may also include API calls from the graphics library wrapper 212 to the graphics library 214. Graphical commands may also include instructions sent to the driver or graphics processor 216, such as those sent from the graphics library 214. Display data may include processed images, such as rendered or rasterized images created by a processor such as a graphics processor 216 and output to a frame buffer or a display. Commands from the application module 210 through the graphics processor 216 are generally considered graphical commands and data from the graphics processor 216 to the display 104 are generally considered display data. In prior display capturing systems, display data is sent to the server(s) 112. In the present system, graphical commands are sent to the server(s) 112. The graphical commands sent to the server(s) 112 may also include other graphical information such as graphical data as explained herein, such as graphical resources to generate images for a display.

In some examples, graphics calls (such as those from the graphic library wrapper 212, or elsewhere) or other graphical information may be reformatted or otherwise manipulated by the device 102. For example, certain graphical assets may be referred to by a particular memory address in the graphics library 214 but may be at a different location in the server(s) 112. Thus, the memory address in a call from the graphics library wrapper 212 may be changed prior to being stored to the graphical command buffer 218 and/or sent to the server(s) 112, as discussed in further detail below with regard to FIGS. 3A-3B.

Graphical information may otherwise be manipulated prior to sending to the server(s) 112. This manipulation may also include altering or removing certain unnecessary graphical commands at the device 102 prior to storing to the graphical command buffer 218 and/or sending to the server(s) 112 in order to reduce size and otherwise improve graphical command recording efficiency. For example, the device 102 may detect and/or remove redundant state changes or no-effect commands. The device 102 may also detect and/or removed duplicated or overlapping memory blocks in resources. The device 102 may also perform compression (potentially lossless compression) of certain resources to reduce transmission payload size. The device 102 may also coordinate asynchronous transmission of resources that are not needed immediately, such as textures, etc.

The graphical commands, which may initially be configured for the device 102 (such as based on the device's OS, or other setting) may be reconfigured prior to being sent to the server(s) 112. Graphical data, which may initially be configured for the device 102 may also be reconfigured prior to being sent to the server(s) 112. If graphical data is reconfigured, corresponding graphical command(s) may also be reconfigured so the graphical command sent to the server(s) 112 is configured to expect and operate on the new graphical data. For example, graphical commands may be translated into a language that may be more easily understood at the server(s) 112 side, the graphical commands may be reformatted based on a configuration of the server(s) 112 (such as based on the server's OS, or other setting), or otherwise. In another example, vector data for operation on by a graphical command may be transformed to match a desired screen area by scaling the geometries of the vector data up or down. In another example, a graphics command may be changed to alter the drawing area and resolution to match a desired display. In another example a graphical command (or group of graphical commands) may be changed to another graphical command (or group of graphical command) if the server(s) 112 do not support the original graphical command(s) and/or if the substituted graphical command(s) would otherwise perform the desired task. For example, shaders may be used to process vertices, geometries, etc. In another example, a pre-rendered image referred to by a graphical command may be converted to a format or configuration that the server(s) 112 can read and use. In another example, output frame buffers may be reconfigured to match a desired display and to handle gamma issues to adjust for brightness differences.

Figure 3A:
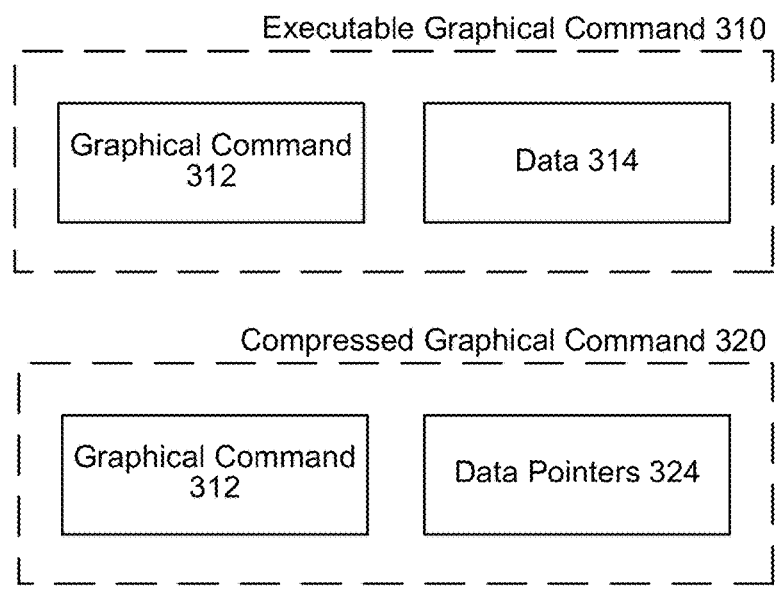
FIGS. 3A-3B illustrate examples of graphical commands and replacing data with data pointers according to embodiments of the present disclosure.
Figure 3B:
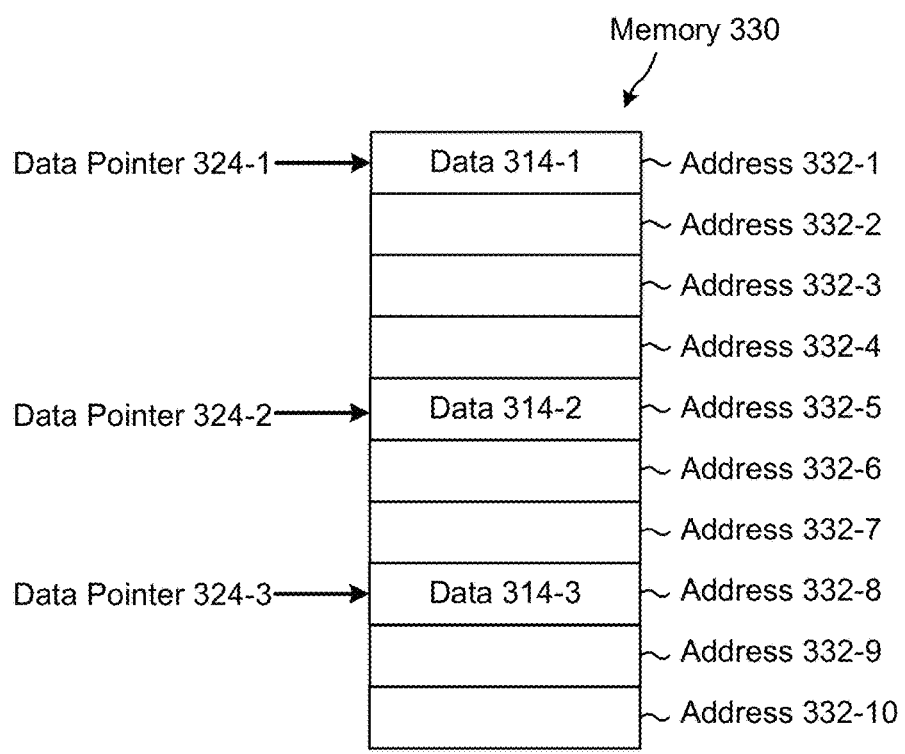

As an example of manipulating graphical commands, FIG. 3A illustrates examples of graphical commands and FIG. 3B illustrates an example of replacing data with data pointers according to embodiments of the present disclosure. As illustrated in FIG. 3A, an executable graphical command 310 may include a graphical command 312 and data 314. For example, the data 314 may be included directly in the graphical command or stored in a buffer, memory location or the like using a relative address during operation of the graphical command. As a result, the executable graphical command 310 may either have a relatively large size (e.g., when the graphical command 310 includes the data 314 directly) or may be executed only when the data 314 is accessible via the relative address (e.g., when the data 314 is referenced using a relative address).

To reduce a size in memory associated with the graphical command and/or to configure the graphical command to be executable on a remote device (such as the server(s) 112), the executable graphical command 310 may be manipulated to generate a compressed graphical command 320. For example, the data 314 (or relative addresses associated with the data 314) may be replaced with data pointers 324 that provide a fixed address to the data 314. Data pointers 324 are illustrated in FIG. 3B. However, the present disclosure is not limited thereto and some graphical commands may include references to fixed addresses prior to the device 102 generating data pointers without departing from the present disclosure.

As illustrated in FIG. 3B, data pointers 324 may provide an absolute address to particular data 314. For example, a memory 330 may include multiple memory locations identified by individual addresses 332 and data 314 may be stored in a portion of the memory locations. Thus, first data 314-1 may be stored in a first memory location associated with address 332-1, second data 314-2 may be stored in a fifth memory location associated with address 332-5 and third data 314-3 may be stored in an eighth memory location associated with address 332-8. To provide a fixed address, the compressed graphical command 320 may include data pointers 324 associated with the data 314. For example, first data pointer 324-1 may identify the first data 314-1, second data pointer 324-2 may identify the second data 314-2 and third data pointer 324-3 may identify third data 314-3. Examples of differences between graphical commands and data pointers are illustrated in FIG. 8 below.

If the data 314 is identified using a relative address and/or using an address local to the device 102, a corresponding data pointer 324 may identify a fixed address or identification associated with the data 314. For example, an application library associated with an application may include application data and the application data may be identified using an identifier or a hash function. A hash function is a function that can be used to map digital data of arbitrary size to digital data of fixed size. The values returned by a hash function are called hash values, hash codes, hash sums, or simply hashes. Various hash functions are known in the art. The device 102 and/or server(s) 112 may maintain a dictionary of hash functions available associated with individual application(s). For example, the device 102 may identify first application data from a first application using a hash function without including the first application data in the graphical command. The server(s) 112 may be prepopulated with the first application data associated with the first application, therefore allowing the server(s) to execute the graphical command without receiving the first application data from the device 102.

Figure 4:
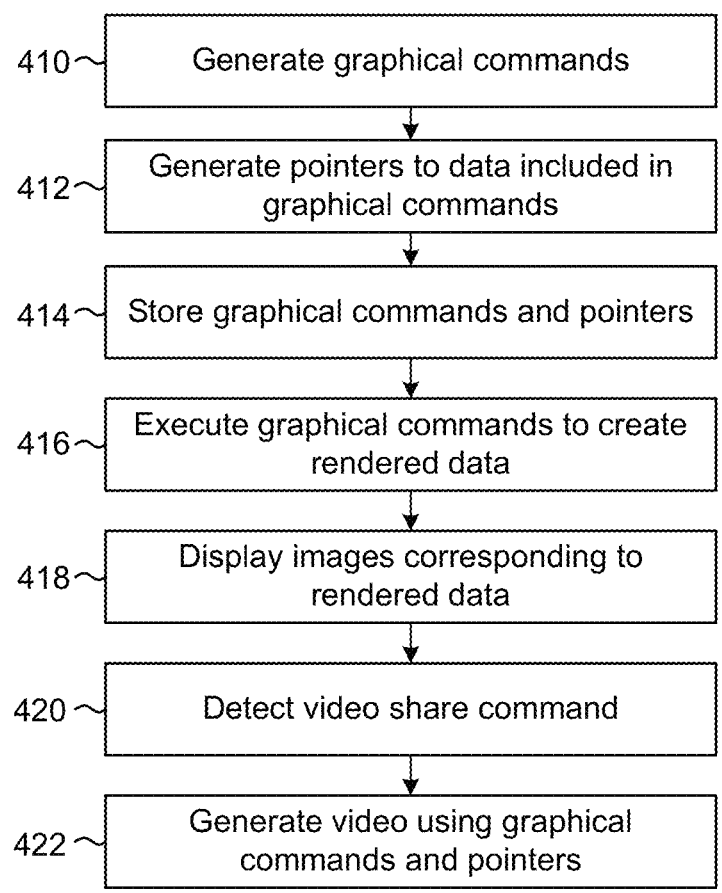
FIG. 4 is a flowchart conceptually illustrating an example method for recording graphical commands and generating display data according to embodiments of the present disclosure.

FIG. 4 is a flowchart conceptually illustrating an example method for recording graphical commands and generating display data according to embodiments of the present disclosure. As illustrated in FIG. 4, the device 102 may generate (410) graphical commands, generate (412) pointers to data (e.g., data pointers) included in the graphical commands and store (414) the graphical commands and pointers. In addition, the device 102 may execute (416) the graphical commands to create rendered data and may display (418) images corresponding to the rendered data. The images may be displayed to the user 10 in a sequence corresponding to the graphical commands. The device 102 may detect (420) a share video command and may generate (422) a video using the graphical commands and pointers stored in step 414. While FIG. 1 illustrates the server(s) 112 generating the video, the disclosure is not limited thereto and the device 102, server(s) 112 and/or additional devices may generate the video without departing from the disclosure. For example, the device 102 may detect the share video command and generate the video on the device 102 using the graphical commands and pointers. Alternatively or additionally, the device 102 may detect the share video command and transmit the graphical commands and pointers to the server(s) 112 and the server(s) 112 may generate the video using the graphical commands and pointers.

Figure 5:
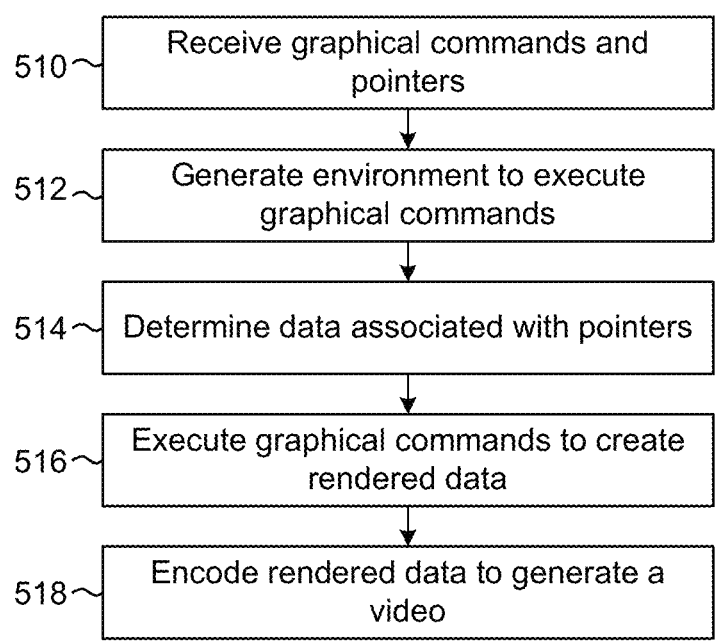
FIG. 5 is a flowchart conceptually illustrating an example method for generating a recording using the graphical commands according to embodiments of the present disclosure.

FIG. 5 is a flowchart conceptually illustrating an example method for generating a video using the graphical commands according to embodiments of the present disclosure. As illustrated in FIG. 5, the device 102 and/or server(s) 112 may receive (510) graphical commands and pointers, for example from the graphical command buffer 218 or other components within the device 102. The device 102 and the server(s) 112 may exchange additional information associated with the graphical commands. For example, the device 102 may transmit a full name, version and executable hash of an application process associated with the graphical commands so that the server(s) 112 associates the graphical commands with a corresponding cache. The device 102 may transmit graphics capabilities such as a display resolution, device orientation, graphics processor, graphics driver information or the like. The device 102 may transmit initial graphics pipeline state, which is an accumulated state of setting changes previously applied to the first recorded frame. For example, if the device 102 configured a hardware blending state (e.g., configured how rendered fragments are blended by changing BlendingState settings), the initial accumulated frame will include the last used blending state (e.g., the current BlendingState settings).

The device 102 and/or server(s) 112 may generate (512) an environment to execute the graphical commands. For example, the device 102 and/or server(s) 112 may generate a sandbox and load application data associated with an application. A sandbox is a tightly controlled environment where applications can be run on the device 102 and/or server(s) 112. Sandboxes restrict access to the device 102 and/or server(s) 112 and may be loaded with limited data, such as application data associated with the application. The device 102 and/or server(s) 112 may determine (514) data associated with the pointers. For example, the device 102 and/or server(s) 112 may use hash functions to identify application data associated with the data pointers. Alternatively, the server(s) 112 may determine if data is unavailable and may request the unavailable data from the device 102. The device 102 and/or server(s) 112 may execute (516) the graphical commands to create rendered data and may encode (518) the rendered data to generate a video. For example, the device 102 and/or server(s) 112 may execute the graphical commands using the data referenced by the data pointers to generate rendered data, which includes continuous image frames as originally displayed to the user 10, and may generate output video data in a traditional video container format (e.g., MPEG-4 Part 10, Advanced Video Coding (MPEG-4 AVC), known as H.264) using the rendered data. The output video data may be stored on the device 102, such that the user 10 may transmit the output video data to a remote device, or may be stored on the server(s) 112, such that the user 10 may transmit a link to the output video data to a remote device.

Figure 6A:
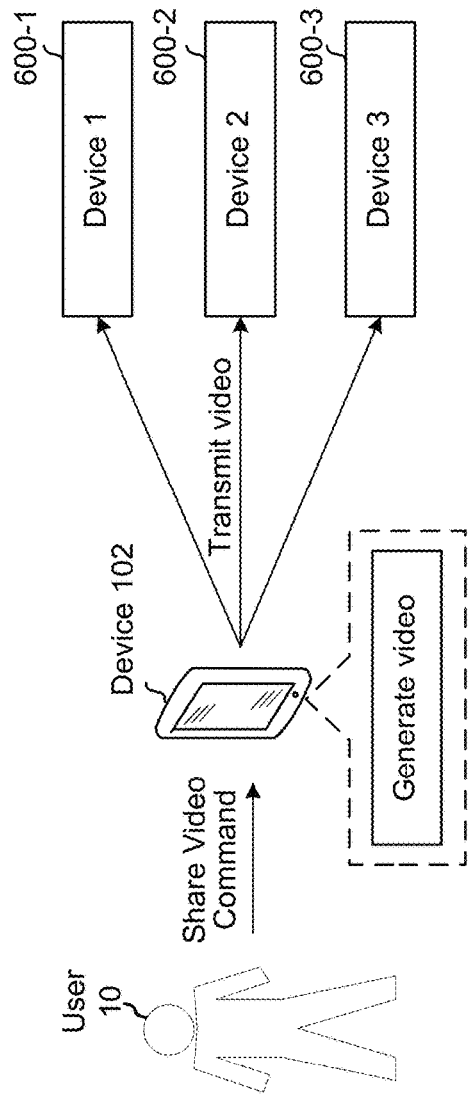
FIGS. 6A-6B are an example and corresponding flowchart conceptually illustrating a device generating video from graphical commands and transmitting the video to remote devices according to embodiments of the present disclosure.

FIG. 6A illustrates an example of a device receiving input from a user, generating video from graphical commands and transmitting the video to remote devices. As illustrated in FIG. 6A, a user 10 may input a share video command to the device 102, the device 102 may generate video using stored graphical commands, as discussed above with regard to FIG. 5, and may transmit the video to a first remote device 600-1, a second remote device 600-2 and/or a third remote device 600-3. For example, the user 10 may be playing a video game on the device 102 and may reach a new high score. After reaching the new high score, the user 10 may decide to share a video of the new high score with friends and may input a record or share video command/instruction to the device 102. While the device 102 may not have stored the post-rendering display data associated with reaching the new high score, the device 102 may access the stored graphical commands and re-execute those stored graphical commands to generate video data (which may include post-rendering display data as part of the images of the video data) and transmit the video data to the multiple friends.

Figure 6B:
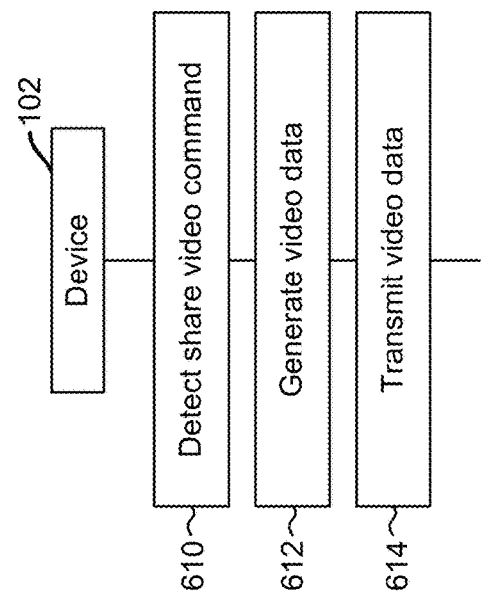

FIG. 6B is a flowchart conceptually illustrating an example method for generating the video data on the device in response to user input according to embodiments of the present disclosure. As illustrated in FIG. 6B, the device 102 may detect (610) a share video command, may generate (612) video data and may transmit (614) the video data to remote devices. For example, after executing the video game/application the device 102 may detect the share video command instructing the device 102 to generate video data using graphical commands stored in a buffer. The device 102 may perform the steps described above with regard to FIG. 5 to generate the video data locally on the device 102, using the stored graphical commands, data pointers and application data on the device 102, and may transmit the generated video data to a first device 600-1, a second device 600-2 and/or a third device 600-3.

Figure 7A:
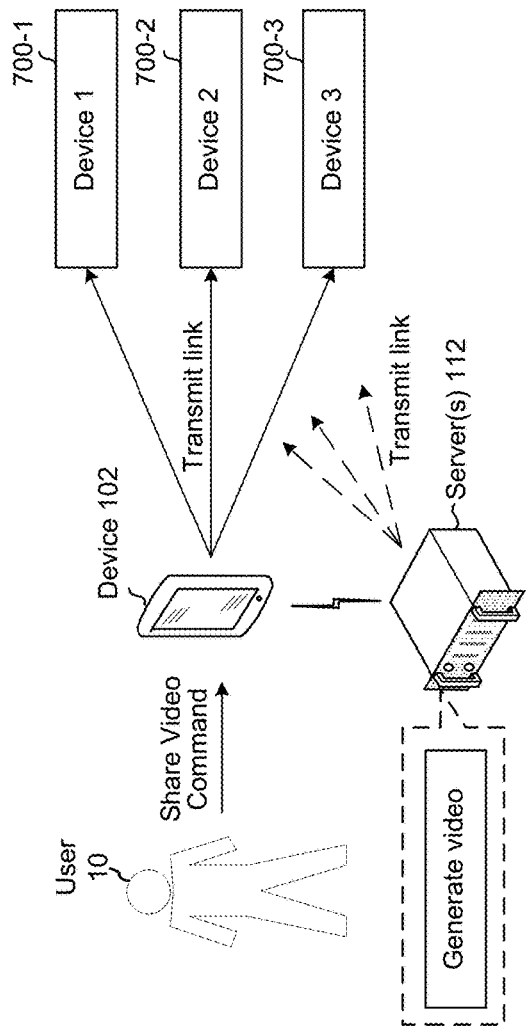
FIGS. 7A-7B are an example and corresponding flowchart conceptually illustrating a server generating video from graphical commands received from a device and the device transmitting a link to the video to remote devices according to embodiments of the present disclosure.
Figure 7B:
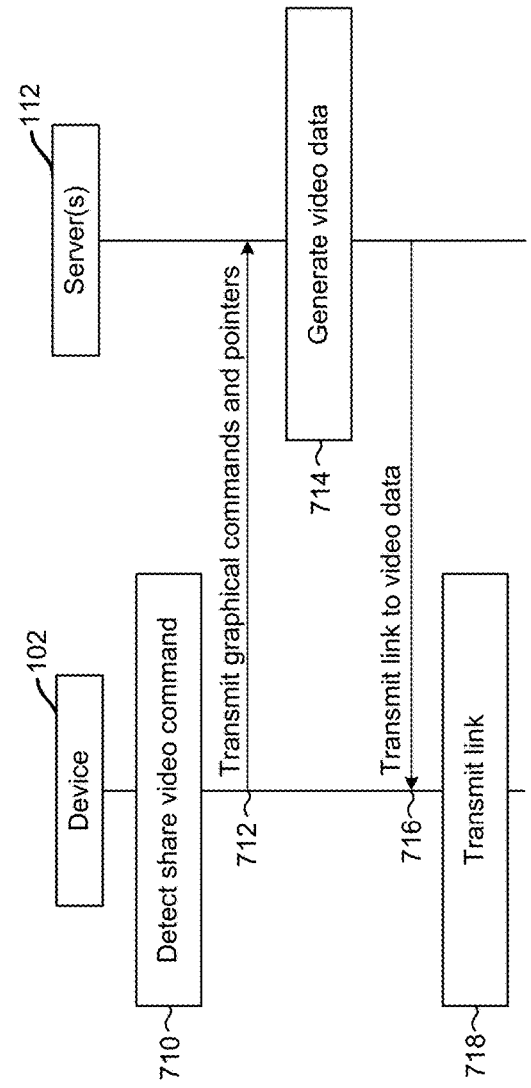

While FIGS. 6A and 6B illustrate the local device 102 generating the video data, in addition (or alternatively) the video may be generated by a remote device, such as server(s) 112. Server generation of the video is illustrated in FIGS. 7A and 7B. FIG. 7A illustrates an example of a device receiving input from a user, generating video from graphical commands using a server and transmitting a link to the video to remote devices. As illustrated in FIG. 7A, a user 10 may input a share video command to the device 102, the device 102 may communicate with server(s) 112 to generate a video on the server(s) 112, as discussed above with regard to FIG. 5, and the device 102 may transmit a link to the video to a first remote device 700-1, a second remote device 700-2 and/or a third remote device 700-3. For example, the user 10 may be playing a video game on the device 102 and may reach a new high score. After reaching the new high score, the user 10 may decide to share a video of the new high score with multiple friends and may input the share video command to the device 102. While the device 102 did not store the display data associated with reaching the new high score, the device 102 stored graphical commands and associated data pointers. Therefore, the device 102 may transmit the stored graphical commands and data pointers to the server(s) 112. The server(s) 112 may execute the graphical commands using application data stored on the server(s) 112 and may generate video data. The server(s) 112 may transmit a link to the video data to the device 102 and the device 102 may transmit the link to the multiple friends. However, the present disclosure is not limited thereto and the server(s) 112 may transmit the link directly to the first remote device 700-1, the second remote device 700-2 and/or the third remote device 700-3, as illustrated in FIG. 7A by the dotted lines, in addition to the device 102, without departing from the present disclosure.

As used herein, application data may include application specific-data or any data used by the application in executing the graphical commands. If the server(s) 112 lack application data required by the graphical commands, the server(s) 112 may transmit a request for the missing application data from the device 102 and the device 102 may transmit the missing application data. In some examples, the device 102 may be running the video game application locally and the graphical commands may refer to application data stored on the device 102. In these examples, the server(s) 112 may recreate the environment of the video game application on the server(s) 112 using application data stored on the server(s) 112. Thus, the device 102 may upload the graphical commands and the data pointers, without uploading the application data, and the server(s) may generate the video using the graphical commands and the application data stored on the server(s) 112. In other examples, the device 102 may be running the video game application using the server(s) 112 (e.g., an internet video game or the like running on a browser on the device 102), and the graphical commands may refer to application data stored on the server(s) 112. In these examples, the environment already exists on the server(s) 112 and the device 102 may upload the graphical commands and the server(s) may generate the video by executing the graphical commands using the application data stored on the server(s) 112.

FIG. 7B is a flowchart conceptually illustrating an example method for generating the video data on the server in response to user input according to embodiments of the present disclosure. As illustrated in FIG. 7B, the device 102 may detect (710) a share video command and may transmit (712) stored graphical commands and pointers to the server(s) 112. The server(s) 112 may generate (714) video data as discussed in greater detail above with regard to FIG. 5 and may transmit (716) a link to the video data to the device 102. The device 102 may transmit (718) the link to the video data to remote devices. For example, after displaying display data to the user 10 the device 102 may detect the share video command instructing the device 102 to generate video data using graphical commands stored in a buffer. The device 102 may transmit the graphical commands to the server(s) 112 and the server(s) 112 may perform the steps described above with regard to FIG. 5 to generate the video data on the server(s) 112 using the stored graphical commands, data pointers and application data on the server(s) 112. The server(s) 112 may then transmit a link to the video data to the device 102, and the device 102 may transmit the link to a first device 700-1, a second device 700-2 and/or a third device 700-3. However, the present disclosure is not limited thereto and the server(s) 112 may transmit the link directly to the first remote device 700-1, the second remote device 700-2 and/or the third remote device 700-3 without departing from the present disclosure.

While FIGS. 7A-7B illustrate the server(s) 112 transmitting a link to the video data to the device 102, the present disclosure is not limited thereto. Instead, the server(s) 112 may transmit the video data to the device 102 without departing from the disclosure. Similarly, the device 102 may transmit the video data to the remote devices (e.g., first device 700-1, second device 700-2 and/or third device 700-3) without departing from the present disclosure.

FIG. 8 illustrates an example of a record ring buffer according to embodiments of the present disclosure. As illustrated in FIG. 8, the device 102 may display frames (e.g., F0, F1, F150, F331) sequentially at a certain frames per second (fps) (e.g., at 30 fps or the like). The device 102 may display the frames on a display of the device while storing graphical commands associated with each frame (e.g., recorded frames R0 to R331) in a record ring buffer 810. The record ring buffer 810 may store graphical commands associated with a fixed number of recorded frames (e.g., 300 recorded frames) before overwriting the graphical commands associated with the first recorded frame. Therefore, when the device 102 receives a first share video command 820-1 after recorded frame R150, the device 102 may generate a video using the graphical commands stored in the record ring buffer 810 at a first time (e.g., recorded frames R0 to R150). However, when the device 102 receives a second share video command 820-2 after recorded frame R330, the device 102 may generate a video using the graphical commands stored in the record ring buffer 810 at a second time (e.g., recorded frames R31 to R330). As illustrated in FIG. 8, recorded frames R0 to R30 are overwritten by the most recently stored recorded frames R300 to R330 at the second time.

The device 102 may run one or more processes at a single time and the device 102 may store graphical commands associated with all processes, one ring-per-process (e.g., an individual record ring buffer 810 associated with each process), white-listed processes or a single process. An individual process may generate graphics data which are displayed by the frames, and the record ring buffer 810 may store all graphics commands associated with each frame as an array of recorded frames.

The user 10 may trigger the share video command 820 at any point. In response to detecting the share video command 820, the device 102 may generate video data using the graphical commands stored in the record ring buffer 810 when the share video command 820 is received. The video data may be output using typical file formats, for example using formats associated with the Moving Picture Experts Group (MPEG) such as MPEG-4. The device 102 may generate the MPEG-4 file locally, as discussed above at least with regard to FIGS. 6A-6B, using data stored on the device 102. Additionally or alternatively, the device 102 may transmit the contents of the record ring buffer 810 to the server(s) 112 and the server(s) 112 may generate the MPEG-4 file, as discussed at least with regard to FIGS. 7A-7B. In some examples, the server(s) 112 may pre-cache resources referenced by the graphical commands stored in the record ring buffer 810 as the graphical commands are executed and stored so that the device 102 only has to transmit the graphical commands to the server(s) 112 without transmitting additional data.

FIG. 9 illustrates an example of storing a display frame and a recorded frame according to embodiments of the present disclosure. As illustrated in FIG. 9, each of the displayed frames (e.g., F0 to F150) may be stored in a memory 910 on the device 102 (e.g., frame F150 stored in memory address 0x50000000) while the frame is being displayed. The device 102 may store corresponding recorded frames (e.g., R0 to R150) in the record ring buffer 810 at a different location in the memory (e.g., frame R150 stored in memory address 0x70000000). The displayed frames and the recorded frames may reference application data, illustrated by roughly 100 Megabytes (MB) of game data or assets being stored beginning at memory address 0x80000000.

After displaying the display frame (e.g., F150), the device 102 may remove the display frame from the memory but may retain a copy of the recorded frame R150 and may retain any application data referenced by the display frame for a period of time. For example, the device 102 may associate the application data referenced by display frame F150 until the recorded frame R150 is removed from the record ring buffer 810 or until the game level is unloaded or the application data is otherwise removed from the memory by the device 102. If the device 102 removes the application data from the memory, the device 102 may generate a compressed copy of the application data referenced by the recorded frame R150. Alternatively, if the device 102 removes the application data from the memory and doesn't create a compressed copy, the device 102 may remove the recorded frame R150 and potentially previous frames. This may result in recording being disabled between game levels, menu icons or other transitions where the application data is removed from memory.

FIG. 10 illustrates examples of graphical commands and compressed graphical commands according to embodiments of the present disclosure. As illustrated in FIG. 10, a graphical command may reference application data stored in local memory, such as application data stored in memory address 0x80000000. However, the graphical command may be compressed to generate compressed graphical commands by inserting data pointers referencing the application data. As a result, the compressed graphical commands sent from the device 102 to the server(s) 112 may include data pointers (e.g., hashes) referencing application data stored on the server(s) 112, reducing an amount of data to upload to the server(s) 112.

If the application data referenced by the data pointer is unavailable on the server(s) 112, the server(s) 112 may request the application data and the device 102 may transmit the requested application data to the server(s) 112. The server(s) 112 may continue to cache the requested application data and may use the requested application data for other processes involving the application. Thus, the server(s) 112 may retain a cache of resources associated for a single application, including application data received from multiple devices 102. For example, multiple devices 102 may run a single application and the server(s) 112 may receive application data from a first device 102-1 and use the received application data when referenced by a second device 102-2 and/or a third device 102-3.

Figure 11A:
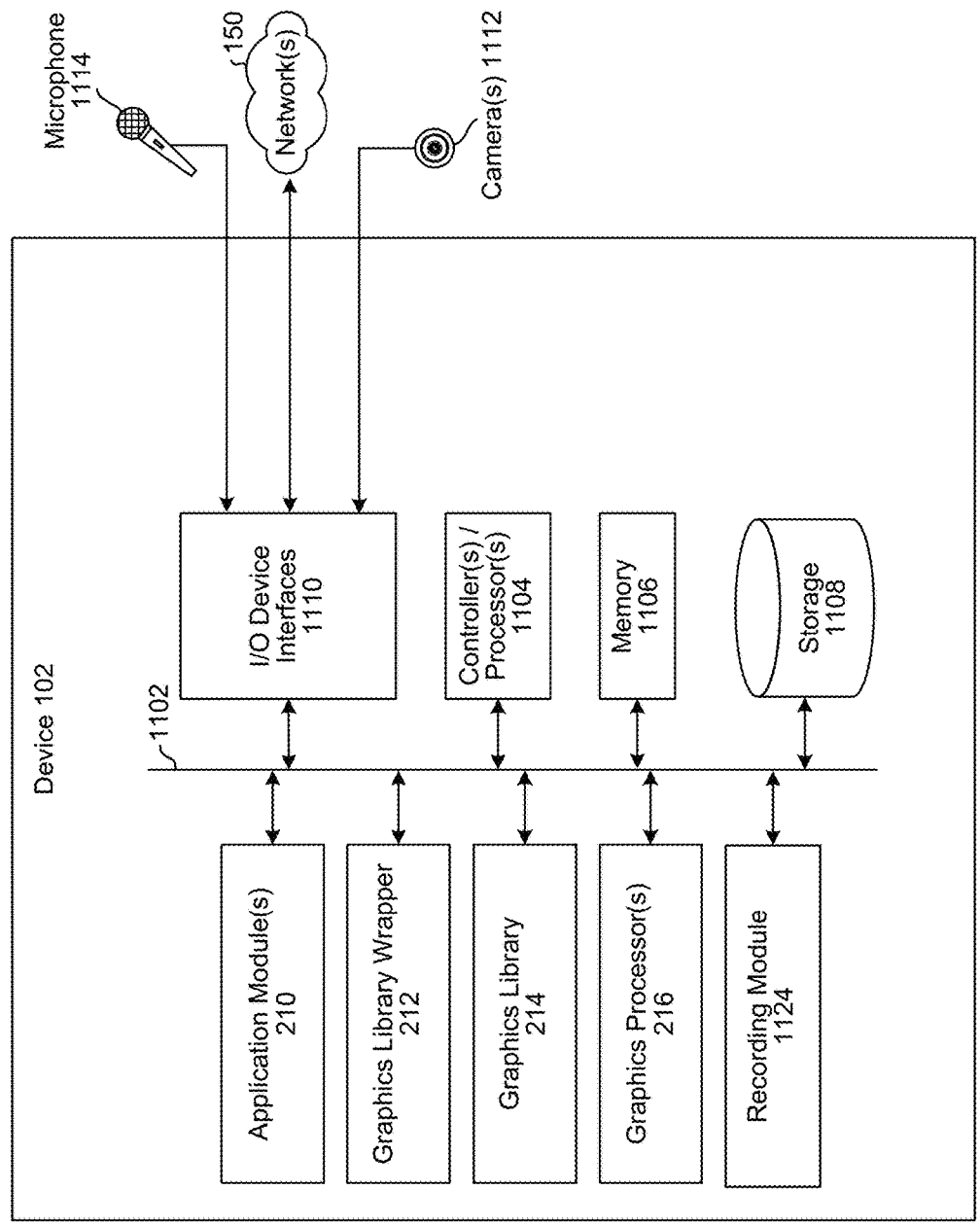
FIGS. 11A-11B are block diagrams conceptually illustrating example components of a system according to embodiments of the present disclosure.
Figure 11B:
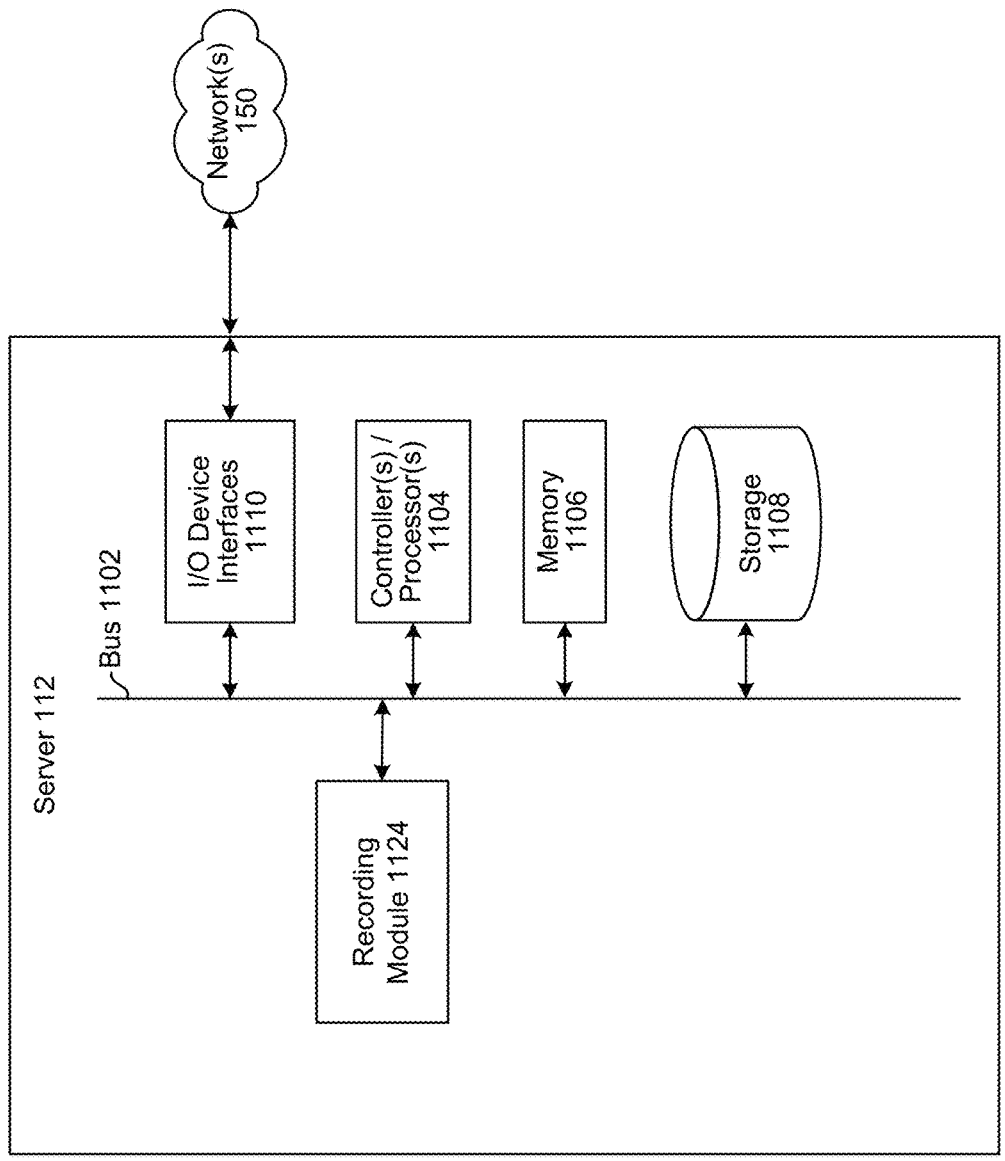

FIGS. 11A-11B illustrates block diagram conceptually illustrating example components of a system 100 including a local device, such as device 102, and/or a remote device, such as a server(s) 112. Multiple such remote devices may be included in the system. Other components not illustrated may also be included in the device 102/server(s) 112. In operation, the system 100 may include computer-readable and computer-executable instructions that reside in storage 1108 on the device 102/server(s) 112. The device 102 may be an electronic device capable of displaying display data, storing graphical commands and/or uploading the graphical commands to the server(s) 112. Examples of electronic devices may include computers (e.g., a desktop, a laptop, a server or the like), portable devices (e.g., a smart phone, tablet or the like), media devices (e.g., televisions, video game consoles, set-top boxes, headless devices or the like) or the like. The device 102 may also be a component of any of the abovementioned devices or systems.

As illustrated in FIGS. 11A-11B, the device 102/server(s) 112 may include an address/data bus 1102 for conveying data among components of the device 102/server(s) 112. Each component within the device 102/server(s) 112 may also be directly connected to other components in addition to (or instead of) being connected to other components across the bus 1102.

The device 102/server(s) 112 may include one or more controllers/processors 1104 comprising one-or-more central processing units (CPUs) for processing data and computer-readable instructions and a memory 1106 for storing data and instructions. The memory 1106 may include volatile random access memory (RAM), non-volatile read only memory (ROM), non-volatile magnetoresistive (MRAM) and/or other types of memory. The device 102/server(s) 112 may also include a data storage component 1108 for storing data and processor-executable instructions. The data storage component 1108 may include one or more non-volatile storage types such as magnetic storage, optical storage, solid-state storage, etc. The device 102/server(s) 112 may also be connected to a removable or external non-volatile memory and/or storage (such as a removable memory card, memory key drive, networked storage, etc.) through the input/output device interfaces 1110.

The device 102/server(s) 112 includes input/output device interfaces 1110. A variety of components may be connected to the device 102 through the input/output device interfaces 1110, such as camera(s) 104 and a microphone 1114. However, the disclosure is not limited thereto and the device 102 may not include an integrated camera or microphone. Thus, the camera(s), microphone 1114 and/or other components may be integrated into the device 102 or may be separate without departing from the disclosure.

The input/output device interfaces 1110 may be configured to operate with a network 150, for example a wireless local area network (WLAN) (such as WiFi), Bluetooth, zigbee and/or wireless networks, such as a Long Term Evolution (LTE) network, WiMAX network, 3G network, etc. The network 150 may include a local or private network or may include a wide network such as the internet. Devices may be connected to the network 150 through either wired or wireless connections.

The input/output device interfaces 1110 may also include an interface for an external peripheral device connection such as universal serial bus (USB), FireWire, Thunderbolt, Ethernet port or other connection protocol that may connect to networks 150. The input/output device interfaces 1110 may also include a connection to an antenna (not shown) to connect one or more networks 150 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102/server(s) 112 further includes a recording module 1124, which may comprise processor-executable instructions stored in storage 1108 to be executed by controller(s)/processor(s) 1104 (e.g., software, firmware), hardware, or some combination thereof. For example, components of the recording module 1124 may be part of a software application running in the foreground and/or background on the device 102/server(s) 112. The recording module 1124 may control the device 102 as discussed above, for example with regard to FIGS. 1, 2A, 2B, 4 and/or 5. Some or all of the controllers/modules of the recording module 1124 may be executable instructions that may be embedded in hardware or firmware in addition to, or instead of, software. In one embodiment, the computing device 102 may operate using an Android® operating system (such as Android® 4.3 Jelly Bean, Android® 4.4 KitKat or the like).

The device 102/server(s) 112 may also include buffer(s) (not shown) which may store data used by the recording module 1124 and/or other components as described above. The buffer(s) may be a non-transitory memory. The buffer(s) may be configured to hold a limited amount of graphical commands (for example 1-5 minutes or a fixed number of graphical commands) to allow the device 102 to capture graphical commands prior to a user 10 commanding the device 102 to record the graphical commands.

Executable computer instructions for operating the device 102/server(s) 112 and its various components may be executed by the controller(s)/processor(s) 1104, using the memory 1106 as temporary "working" storage at runtime. The executable instructions may be stored in a non-transitory manner in non-volatile memory 1106, storage 1108, or an external device. Alternatively, some or all of the executable instructions may be embedded in hardware or firmware in addition to or instead of software.

The device 102 may further include the application module(s) 210, graphics library wrapper 212, graphics library 214 and/or graphics processor(s) 216 described in greater detail above with regard to FIGS. 2A-2B. The components of the device(s) 102 and server(s) 112, as illustrated in FIGS. 11A and 11B, are exemplary, and may be located a standalone device or may be included, in whole or in part, as a component of a larger device or system.

As illustrated in FIG. 12, multiple devices 102/112 may be connected over a network 150. The network 150 is representative of any type of communication network, including data and/or voice network, and may be implemented using wired infrastructure (e.g., cable, CAT5, fiber optic cable, etc.), a wireless infrastructure (e.g., WiFi, RF, cellular, microwave, satellite, Bluetooth, etc.), and/or other connection technologies. Devices may thus be connected to the network 150 through either wired or wireless connections. Network 150 may include a local or private network or may include a wide network such as the internet. For example, a smart phone 102, a tablet computer 102d, and/or a laptop computer 102f may be connected to the network 150 through a wireless service provider, over a WiFi or cellular network connection, over a wired connection or the like. Other devices, such as server(s) 112, headless device 102b, set-top box 102c and/or desktop computer 102e may connect to the network 150 through a wired connection or wireless connection.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for recording graphical commands, the method comprising:
    operating a video game application on a mobile device;
    generating, by the video game application, a call to an application programming interface;
    generating, by the application programming interface, a first graphical command, wherein the first graphical command is executable by a graphics processor and operates on graphical data;
    generating, by the application programming interface, a second graphical command, wherein the second graphical command is subsequent to the first graphical command, is executable by the graphics processor and operates on graphical data;
    storing the first graphical command and the second graphical command, wherein the storing comprises storing an indicator that the second graphical command is to be executed subsequent to the first graphical command;

executing the first graphical command by a graphics processor of the mobile device to generate first rendered image data, wherein the first rendered image data is generated based on a resolution of a display of the mobile device;

displaying, at a first time, a first image on the display of the mobile device, wherein the first image is based on the first rendered image data;

receiving, at a second time after the first time, a share video command, wherein the share video command instructs the mobile device to generate video data using the first graphical command and the second graphical command; and sending, at a third time after the second time, the first graphical command, the second graphical command and the indicator to a remote device to generate the video data.

2. The computer-implemented method of claim 1, further comprising:

determining application data associated with the video game application, wherein the application data is stored on the mobile device and includes images of the video game application;

executing the first graphical command, wherein the first graphical command references the application data to generate first rendered image data;

executing the second graphical command using the application data to generate second rendered image data; and encoding the first rendered image data and the second rendered image data to generate video data.

3. The computer-implemented method of claim 1, further comprising:

determining first graphical data associated with the first graphical command; and generating a first pointer referencing the first graphical data, wherein the first pointer is an address identifying a location of the first graphical data in memory, wherein the storing further comprises:

storing the first graphical command and the first pointer.

4. The computer-implemented method of claim 3, wherein the first pointer refers to data stored on the remote device, the method further comprising:

by the remote device, receiving device settings associated with the mobile device;

configuring resources of the remote device in a manner that replicates graphical processing by the mobile device; and receiving application data associated with the video game application, the application data including the first data, and by the resources of the remote device:

receiving the first graphical command;

receiving the second graphical command;

receiving the first pointer;

determining the first data associated with the first pointer;

executing the first graphical command using the first data to generate second rendered image data;

executing the second graphical command to generate third rendered image data; and encoding the second rendered image data and the third rendered image data to generate video data replaying images associated with the operating the video game application.

5. A computer-implemented method, the method comprising, by a local device:

generating a first graphical command that is formatted for execution by a graphics processor;

generating a second graphical command that is subsequent to the first graphical command and is formatted for execution by the graphics processor;

storing the first graphical command;

storing the second graphical command;

storing an indicator that the second graphical command is to be executed subsequent to the first graphical command;

generating display data using the graphics processor, the first graphical command and the second graphical command;

sending, at a first time, the display data to a display communicatively connected to the local device;

receiving, at a second time after the first time, a share video command, wherein the share video command instructs the local device to generate video data using the first graphical command and the second graphical command; and sending, at a third time after the second time, the first graphical command, the second graphical command and the indicator to a remote device to generate the video data.

6. The computer-implemented method of claim 5, further comprising:

determining application data, stored on the local device, that is associated with an application;

executing the first graphical command using the application data to generate first rendered image data;

executing the second graphical command using the application data to generate second rendered image data; and encoding the first rendered image data and the second rendered image data to generate video data.

7. The computer-implemented method of claim 5, further comprising:

by the remote device:

receiving the first graphical command;

receiving the second graphical command;

determining application data associated with an application that is stored on the remote device;

determining first data referenced by the first graphical command that is not stored on the remote device;

requesting the first data from the local device;

receiving the first data from the local device;

executing the first graphical command using the application data and the first data to generate first rendered image data;

executing the second graphical command using the application data to generate second rendered image data; and encoding the first rendered image data and the second rendered image data to generate video data.

8. The computer-implemented method of claim 5, further comprising:

determining first data associated with the first graphical command; and generating a first pointer referencing the first data, wherein the storing further comprises:

storing the first graphical command and the first pointer.

9. The computer-implemented method of claim 8, wherein the first pointer refers to data stored on the remote device.

10. The computer-implemented method of claim 8, further comprising, by the remote device:

receiving device settings associated with the local device;
configuring resources in a manner that replicates graphical processing by the local device;
accessing application data associated with an application, the application data including the first data;
receiving the first graphical command;
receiving the second graphical command;
receiving the first pointer;
determining the first data associated with the first pointer;
executing the first graphical command using the first data to generate first rendered image data;
executing the second graphical command to generate second rendered image data; and
encoding the first rendered image data and the second rendered image data to generate video data.

11. The computer-implemented method of claim 5, wherein the first graphical command operates on one of pre-rasterized data and auxiliary post-rasterized data.

12. The computer-implemented method of claim 11, wherein:
the pre-rasterized data comprises vector data; and
the first graphical command operates on the pre-rasterized data to generate pixel data.

13. The computer-implemented method of claim 5, wherein the first graphical command and the second graphical command are associated with a first application and are stored in a buffer, the method further comprising:
generating, after the first time and before the second time, a third graphical command associated with a second application; and
storing the third graphical command in the buffer.

14. The computer-implemented method of claim 5, wherein the first graphical command and the second graphical command are associated with a first application and are stored in a first buffer, the method further comprising:
generating, after the first time and before the second time, a third graphical command associated with a second application; and
storing the third graphical command in a second buffer.

15. The computer-implemented method of claim 5, further comprising:
storing, prior to the second time, a plurality of graphical commands, the plurality of graphical commands including the first graphical command, the second graphical command, and a third graphical command, wherein the first graphical command and the second graphical command are associated with a first application and the third graphical command is associated with a second application;
determining that the share video command is associated with the first application; and
selecting a portion of the plurality of graphical commands that are associated with the first application, the portion of the plurality of graphical commands including the first graphical command and the second graphical command.

16. A computing system, comprising:
at least one processor, including a graphics processor; and
at least one memory device including instructions operable to be executed by the at least one processor to configure the system for:
generating a first graphical command that is formatted for execution by the graphics processor;
generating a second graphical command that is subsequent to the first graphical command and is formatted for execution by the graphics processor;
generating first display data using the graphics processor, the first graphical command and the second graphical command;
generating first frame data corresponding to the first display data, the first frame data including at least the first graphical command, the second graphical command and an indicator that the second graphical command is to be executed subsequent to the first graphical command;
sending, at a first time, the first display data to a display communicatively connected to a first device;
generating second display data using the graphics processor and a third graphical command;
generating second frame data corresponding to the second display data;
sending, at a second time after the first time, the second display data to the display; and
receiving, at a third time after the second time, a share video command, wherein the share video command instructs the first device to generate video data using the first frame data and the second frame data.

17. The computing system of claim 16, wherein the instructions further configure the system for:
determining application data that is stored on the first device, the application data being associated with an application;
executing the first graphical command using the application data to generate first rendered image data;
executing the second graphical command using the application data to generate second rendered image data; and
encoding the first rendered image data and the second rendered image data to generate the video data.

18. The computing system of claim 16, wherein the instructions further configure a second device of the system for:
receiving the first frame data;
determining application data that is stored on the second device, the application data being associated with an application;
determining that first data referenced by the first graphical command is not stored on the second device;
requesting the first data from the first device;
receiving the first data from the first device;
executing the first graphical command using the application data and the first data to generate first rendered image data;
executing the second graphical command using the application data to generate second rendered image data; and
encoding the first rendered image data and the second rendered image data to generate video data.

19. The computing system of claim 16, wherein the instructions further configure the system for:
determining first data associated with the first graphical command;
generating a first pointer referencing the first data; and
storing the first graphical command and the first pointer.

20. The computing system of claim 19, wherein the first pointer refers to data stored on a second device.

21. The computing system of claim 20, wherein the instructions further configure the system for:
receiving device settings associated with the first device;
configuring resources in a manner that replicates graphical processing by the first device;
accessing application data associated with an application, the application data including the first data;

receiving the first frame data;
receiving the first pointer;
determining the first data associated with the first pointer;
executing the first graphical command using the first data to generate first rendered image data;
executing the second graphical command to generate second rendered image data; and
encoding the first rendered image data and the second rendered image data to generate video data.

22. The computing system of claim 16, wherein the first graphical command operates on one of pre-rasterized data and auxiliary post-rasterized data.

23. The computing system of claim 22, wherein:
the pre-rasterized data comprises vector data; and
the first graphical command operates on the pre-rasterized data to generate pixel data.

24. The computing system of claim 16, wherein the instructions further configure the system for:
storing, prior to the first time, in a buffer of the first device, first buffer data corresponding to a first number of frames of display data, the first buffer data including the first frame data and third frame data;
storing, after the first time and prior to the second time, second buffer data corresponding to the first number of frames, the second buffer data including the first frame data and the second frame data, the second frame data overwriting the third frame data; and
generating, after the third time and using the second buffer data, the video data, wherein the video data has the first number of frames.

\* \* \* \* \*